Patented June 8, 1954

2,680,670

UNITED STATES PATENT OFFICE 2,680,670

PRODUCTION OF ZIRCONIUM IODIDE

Howard J. Smith, Kenmore, N. Y., assignor to National Lead Company, New York, N. Y., a corporation of New Jersey No Drawing. Application August 17, 1950,
Serial No. 180,076

2 Claims. (Cl. 23—87)

This invention relates to the production of zirconium tetraiodide and relates to a novel process by which such iodide may be made at low cost and of great purity.

The iodides of zirconium have been utilized extensively for the preparation of very pure and ductile elemental zirconium. The process, as described by van Arkel and de Boer, consists in thermal decomposition of the metal iodide by impingement on a tungsten filament at a very high temperature. Zirconium tetraiodide used in this operation is commonly produced "in situ" during the process by reaction of relatively impure zirconium metal and elemental iodine. The high cost of the raw metal has been one of several hindrances to large scale production of the metal by this method. The iodides of such zirconium have been prepared separately by several processes such as treating the metal with elementary iodine, heating the metal or its carbide in a stream of hydrogen iodide, or passing a mixture of hydrogen and vapors of the metal tetrachloride and iodine through a tube heated to redness. None of these methods of preparation of zirconium tetraiodide has attained any commercial significance because of the high cost of raw materials or the difficulty encountered in obtaining a product sufficiently pure to meet the requirement of the important application of such tetraiodide, namely, the preparation of the metal.

It is therefore an object of this invention to provide a process for economical and efficient production of zirconium tetraiodide employing commercially available materials. Another object of this invention is to provide a method for the production of zirconium tetraiodide of such purity as to be suitable for production of ductile metal. These and other objects of this invention will be apparent from the following complete description thereof.

This invention in its broadest aspects contemplates the production of zirconium tetraiodide by reacting the cyanonitride of the metal with iodine vapor at a temperature between 600° C. and 1100° C. The method comprises passing the vapors of iodine over lumps of zirconium cyanonitride or through a bed of such material heated to a temperature greater than the sublimation or boiling temperature of the tetraiodide product but not exceeding the dissociation temperature of the tetraiodide. The sublimate or distillate of pure oxygen free zirconium tetraiodide may be passed directly into other apparatus for utilization of this product, such as the preparation of zirconium metal, or may be condensed and recovered in a suitable condensing system.

The zirconium cyanonitride used as a starting material in the practice of this invention is an article of commerce which is considered to be an interstitial compound containing a stoichiometric excess of zirconium over other elements in its composition. The metal content is usually from 80 to 90% by weight; in addition, it contains nitrogen, ranging from 0.5 to 7.0% by weight, carbon ranging from 2.0 to 8.0% by weight, up to 3% oxygen, and a small amount of other impurities. The total of all non-metallic elements contained in zirconium cyanonitride is usually not greater than one half the theoretical quantity required to combine with the zirconium content of the cyanonitride. Thus, the chemical properties of cyanonitride resembles in many ways those of pure metal, for example, it is found to displace hydrogen from sulphuric acid and to burn in air, oxygen, or chlorine at elevated temperature. The cyanonitride is cubic in crystalline form, as shown by its X-ray diffraction pattern. It may, therefore, be described as zirconium or titanium metal in cubic form containing in solid solution the elements carbon and nitrogen and incidental small amounts of oxygen and other impurities. It is normally produced by reaction of naturally occurring mineral zircon (zirconium silicate) with a carefully controlled quantity of carbon in the form of coke, the reaction usually being conducted in an arc furnace.

In the practice of this invention, employment of zirconium cyanonitride as a starting material for the preparation of the iodide avoids many of the difficulties encountered in other methods of manufacture. Since the thermodynamic activity of the zirconium metal content of the cyanonitride is reduced somewhat by the presence of dissolved carbon, nitrogen, and oxygen, the reaction rate never approaches the violent, almost explosive nature of the reaction between iodine and elemental zirconium metal. This peculiar structure of the cyanonitride, nonetheless, permits the reaction with elemental iodine to be conducted at a temperature easily attainable in commercial applications and is found to be well below the dissociation temperature of the metal iodide. Attempts to prepare zirconium tetraiodide by the action of iodine on mixtures of the metal oxide with carbon or on the metal carbide, in which the metal is wholly combined with carbon, have shown that the reaction either does not occur or requires an excessively high temperature. I have found that in the preferred method of this invention a temperature in the range 600° to 1100° C. gives good rates of production and yields almost quantitative recovery of the zirconium contained in the cyanonitride. Use of a higher or lower temperature is less efficient. At temperatures lower than 600° C., rates of production are too low to be of practical value.

The reaction between zirconium cyanonitride and elemental iodine by the preferred procedures of this invention produces pure, oxygen-free zirconium tetraiodide. Carbon remains as a non-reactive residue in the reaction vessel. A small amount of nitrogen gas is given off and passes through the system and out a suitable vent in the condensing system. Oxygen remains as non-reactive zirconium dioxide. Foreign metal contamination is reduced to a minimum since only a few metals form volatile iodides which would carry over into the zirconium tetraiodides. In the case of zirconium tetraiodide, silicon and titanium have been found to be the only contaminants present in greater than trace amounts, but even they amounted to less than 0.1% by weight. All other impurities were found to be less than 0.01% by weight in the zirconium tetraiodide. The tetraiodide is found to contain the metallic element and iodine in stoichiometric proportions and may easily be made in completely oxygen-free form by exercise of reasonable care over the moisture content of the starting materials. In order to prevent contamination of the zirconium tetraiodide with elemental iodine, some of which may pass the reaction vessel without reacting with the cyanonitride, it is advisable to maintain the condenser at a temperature slightly higher than the boiling point of elemental iodine. Under these conditions, iodine vapor passes through the tetraiodide condenser and does not contaminate the product, but may be recovered in auxiliary condensing equipment. The use of a large excess of zirconium cyanonitride in the reaction vessel also helps to prevent carry-over of unreacted iodine, even when high rates of flow of the iodine vapor are used. The excess of cyanonitride is, of course, reusable during subsequent preparations of the tetraiodide.

Zirconium cyanonitride is brittle materials, and may be crushed to any desired particle size. The particle size, however, is not critical in the method of this invention, but may be adjusted to achieve optimum operation of reaction apparatus.

A refinement of the preferred procedures of this invention makes possible some control over the particle size of the zirconium tetraiodide. If the tetraiodide is to be condensed and collected as such, the well-known technique of using a suitable inert diluting gas such as helium or argon mixed with the iodine vapor before passage through the system into the condenser, with proper condenser temperature control, makes possible a wide range of particle size variation. By varying these conditions, the zirconium tetraiodide may be condensed in lump form or as a fine, free-flowing powder of low density, or in numerous intermediate states of aggregation.

The following example illustrates the operation of this invention.

1. Six parts by weight of zirconium cyanonitride crushed to lumps about one half inch or less in size are charged to a vertical reactor tube constructed of suitable materials such as carbon or quartz. The reactor is equipped for heating the tube and its contents to about 1100° C.

2. Fifteen parts of commercial flake iodine are charged to a suitable sublimator, such as a large Pyrex or carbon vessel. The sublimator is bonded to the lower end of the vertical reactor tube by means of a gas-tight seal and has an inlet for an inert diluting gas.

3. A condenser for the zirconium tetraiodide is affixed to the upper end of the vertical reactor tube. Stainless steel, glass, carbon, or other suitable non-reactive materials may be used for construction of the condenser. Surrounding the condenser is a heating mantle, by means of which the temperature of the condenser and its contents are held at 200° C. At its far end, the condenser is vented to the atmosphere.

4. The vertical reactor tube containing the zirconium cyanonitride is heated to a temperature of from 950 to 1050° C. The iodine is then boiled, so that a stream of iodine vapor passes up through the hot bed of cyanonitride at a rate of about one pound per hour per 50 square inches of cross sectional area of the reactor tube. During passage of iodine through the reactor tube, a slow stream of helium, argon, or other inert gas is passed through the system simultaneously at a rate of approximately one volume of inert gas per ten volumes of iodine vapor. This dilution of the iodine vapors causes the zirconium tetraiodide to condense as small, uniform, free-flowing crystals.

5. A total of 17 parts by weight of pure zirconium tetraiodide is recovered from the condenser, representing a recovery of about 96% of the iodine originally charged. About one half the original charge of zirconium cyanonitride remains, since almost 100% excess was used. This balance may be left in place and reused in successive preparations. The zirconium tetraiodide produced by this method is an orange to brick red, free-flowing, crystalline powder containing about 15.2% zirconium by weight.

It will be seen that the method of the present invention provides means for production of zirconium tetraiodide of excellent quality directly from low cost, commercial zirconium cyanonitride. Since no difficulty is encountered in producing pure oxide-free products, the material is eminently suitable for direct conversion to metallic zirconium by the thermal dissociation process.

While this invention has been described and illustrated by the example shown, it is not intended to be strictly limited thereto and other modifications and variations may be employed within the scope of the following claims.

I claim:

1. A method of producing zirconium tetraiodide which comprises reacting zirconium cyanonitride with iodine vapor at a temperature between 600° C. and 1100° C.

2. A method according to claim 1 in which the product is condensed in the presence of an inert gas.

References Cited in the file of this patent

UNITED STATES PATENTS

| Number | Name | Date |
|---|---|---|
| 1,179,394 | Barton | Apr. 18, 1916 |
| 1,351,091 | Barton | Aug. 31, 1920 |
| 1,582,126 | Cooper et al. | Apr. 27, 1926 |
| 1,646,734 | Marden | Oct. 25, 1927 |
| 2,204,454 | Teichmann et al. | June 11, 1940 |
| 2,378,675 | Agnew et al. | June 19, 1945 |
| 2,401,543 | Brallier | June 4, 1946 |
| 2,486,912 | Belchetz | Nov. 1, 1949 |

OTHER REFERENCES

"Handbook of Chemistry and Physics," 28th ed., by C. D. Hodgman, pages 480–481. Chemical Rubber Publishing Co., Cleveland, Ohio.

J. W. Mellor's "A Comprehensive Treatise on Inorganic and Theoretical Chemistry," vol. 2, page 66, and vol. 7 (1927) ed., pages 89, 150, 151. Longmans, Green and Co., N. Y.